United States Patent Office 3,432,094
Patented Mar. 11, 1969

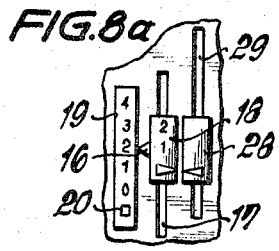
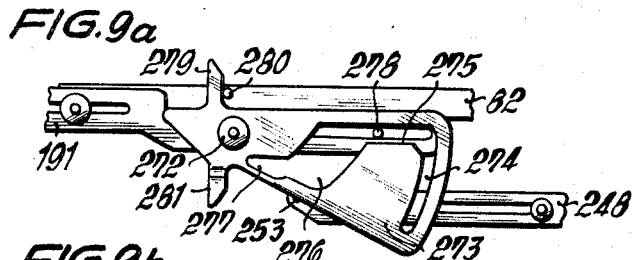
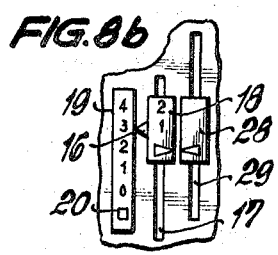
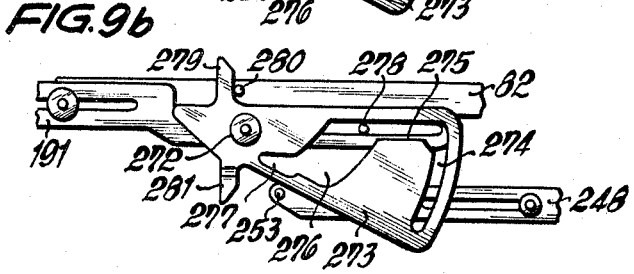
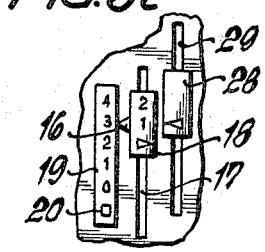
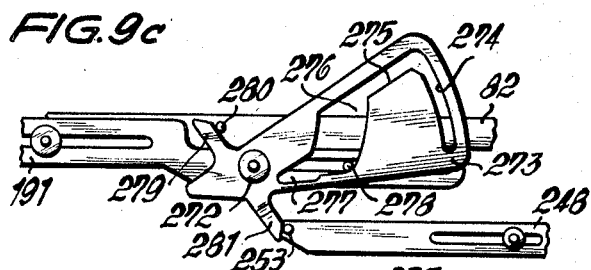
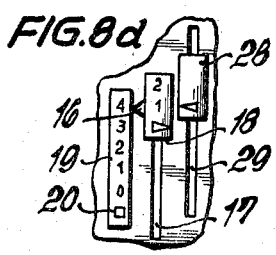
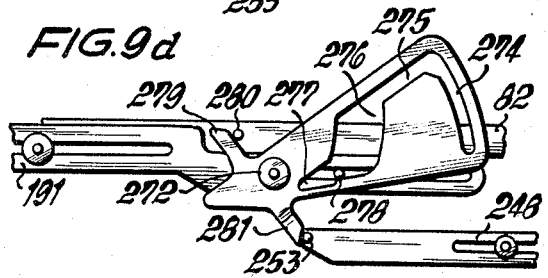
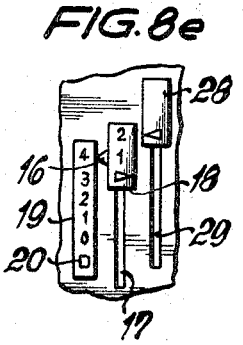
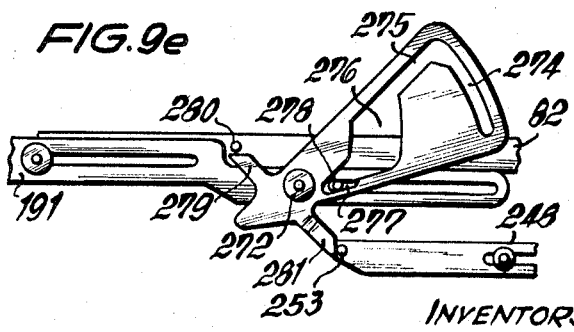

3,432,094
FOUR-SPECIES CALCULATING MACHINE
Andreas Metschnabl, Nuremberg, and Gottfried Burkhardt, Altenfurt, near Nuremberg, Germany, assignors to Diehl, Nuremberg, Germany
Filed Oct. 14, 1965, Ser. No. 496,190
Claims priority, application Germany, Oct. 17, 1964,
D 45,656
U.S. Cl. 235—63    20 Claims
Int. Cl. G06c 23/00, 29/00

The present invention relates to a calculating machine, especially a four-species calculating machine with preadjustable fixed decimal point indication and a printing mechanism and with a device for rounding off the product when calculated from multiplying decimal fractions.

For fully automatically carrying out multiplication and division calculations, calculating machines are known which are provided with a register carriage adjustable in decades and with a main counting mechanism with a large number of places and a rotary or revolutions counting mechanism with a small number of places, both said main counting mechanism and said revolutions counting mechanism being arranged in said register carriage. The entry of values into the calculating machine, as a rule, is in a stepwise manner into a pin carriage through the intervention of a tens keyboard, said pin carriage moving during this operation into the range of displaceable racks. A printing mechanism is usually in continuous engagement with these racks while selectively a stationary result register, the above-mentioned main and revolutions counting mechanisms of the register carriage as well as one or several accumulator or storage units for the input or output of values are adapted to be coupled to said racks. When carrying out a multiplication calculation, the multiplicand is entered into the machine stationary result register and the multiplier is entered into the revolutions counter provided on the register carriage. The main counter, which is customarily provided with a machine stationary tens transfer mechanism, serves for receiving the calculated product. If such a calculating machine is provided with a fully automatically operating auxiliary control device for carrying out multiplication operations, the following operations take place: At the start of the calculation, the register carriage is in its outermost left-hand basic position. Following entry of a value into the tens keyboard, or following the recall of a value from a storage unit and subsequent actuation of a multiplication key, the main machine shaft makes one revolution whereby the value contained in the pin carriage or in the called storage unit is, through the intervention of the racks, movable back and forth, entered as a multiplicand into the result register, and is printed by the printing mechanism, for instance on a sheet or tape of paper. A second value set up in the pin carriage or called from a second storage unit is, upon actuation of the result key, entered into the revolutions counter as a multiplier during a second revolution of the main machine shaft through the intervention of said racks. Also this value, including the symbols "×" and "=" is printed by the printing mechanism. Subsequently, the machine starts the actual calculating operation during which the multiplicand contained in the machine stationary register is, starting with the lowest unit of the multiplier contained in the revolutions counter, multiplied in decades and entered as a product into the main counter cooperating with a machine stationary tens transfer or carry-over device. During this operation, the register carriage moves from its left-hand basic position toward the right until the calculating operation is finished, and is subsequently moved into its right-hand end position from where it returns to its left-hand basic position. When arriving at its left-hand end position, a further revolution of the main machine shaft is initiated so that the output of the product stored in the main counting mechanism is effected through the intervention of the racks, i.e. the product is printed by the printing mechanism and is, if necessary, received by a storage unit which has been called up. During this output of the product simultaneously the product contained in the main counting mechanism is cleared. Depending on whether the calculating machine is provided with a movable reading carriage or with a stationary roll of tape, the printing of the multiplicand, the multiplier, and the product including the calculating symbols is effected in side-by-side relation on a sheet of paper or one after the other on a tape.

If it is desired to carry out multiplications with a calculating machine of the above-mentioned type not only with whole numbers but also with proper and improper decimal fractions, (henceforth called "decimal fractions," the product is also a decimal fraction, i.e. has a number of digits following the decimal point which equals the sum of the decimal digits following the decimal point of the multiplicand and the multiplier. If, for instance, the multiplicand and multiplier each have four decimal places following the decimal point, the product has eight places following the decimal point. The output or the printing of so many digits or places following the decimal point is, in most instances, undesirable so that a number of decimal places have to be suppressed.

This can be done in a very simple manner with a four-species calculating machine having an arrangement for preadjusting a fixed decimal point. In this instance, the multiplicand, the multiplier and the product have the same number of digits following the decimal point, while the additional digits of the product are suppressed.

For the printing of a preadjusted fixed decimal point, it is merely necessary to clip a number of the right-hand type rods or type reels which are intended to be printed with one decimal point type each. These decimal point types normally do not become effective for printing purposes, however, if necessary, they can be put into action, for instance, by a displaceable adjusting knob provided in the keyboard of the calculating machine, for instance in front of the last, the next-to-the-last, or the second-to-the-last digit.

In order to obtain with such a device the product with the proper number of digits in front of the decimal point, it is merely necessary to effect the output of the product not in the left-hand basic position of the register carriage but in a position in which the register carriage, and thereby the main counting mechanism containing the product, is displaced toward the right by the same number of decimal digits or orders that corresponds to the adjusted number of digits following the decimal points. It is, furthermore, a prerequisite that also the multiplicand and the multiplier are entered into the calculating machine with the decimal point in the proper place, which can be effected in a very simple manner by effecting the entry in the same manner as when calculating without a decimal point in the basic position of the register carriage, while for the last decimal digits of the multiplicand and multiplier which are not occupied by one of the digits 1 to 9, the digit "0" has to be entered.

By stopping the register carriage prior to reaching its left-hand end position for the output of the product with the decimal point in the proper place, one or more of the last digits or places of the main counting mechanism move out of the range of the racks. Thus, these decimal places of the calculated product are not put out or printed.

In order to move all places of the main counting mechanism back into their zero or start position following the output of the product, it is merely necessary to provide the calculating machine with clearing racks corresponding in number to the number of the decimal places to be eliminated, said clearing racks being arranged close to the right of the normally provided racks. This "cutting off" operation of the decimal places of the main counting mechanism not being printed or stored—which operation is effected fully automatically by the calculating machine—results in an error in the total when adding a larger number of products. Such an error is frequently undesirable. Furthermore, there exists the need with such calculating machines, for instance when multiplying weights, for instance with kilograms and grams and prices, for instance in dollars and cents, to obtain the result with two decimal places only following the decimal point, i.e. again in dollars and cents. This means that with a product, the number of decimal places following the decimal point has to be reduced with regard to the values entered into the machine by one or two decimal places. Also in this instance, very frequently undesired "rounding-off" errors occur.

It is known to reduce the number of digits following the decimal point in a product obtained during the multiplication of decimal fractions in a storage unit and thereby to effect a rounding-off operation. As criterion for the rounding-off operation serves the first decimal place following the decimal point which is disregarded for the further calculation. If this decimal place is occupied by one of the digits "0 to 4," the value of the digit in front of this last-mentioned decimal place is reduced by one unit. However, if this decimal place is occupied by one of the digits "5 to 9" a rounding-off is effected in such a way that prior to the output of the product the value "5" is entered into this decimal place so that the value of the last decimal place to be reproduced is increased by one unit through the intervention of the tens transfer device provided between this decimal place and the preceding one.

The heretofore known devices for automatically carrying out such a rounding-off operation are relatively expensive and particularly do not operate fully automatically. In addition thereto, such devices are not suitable for four-species calculating machines with preadjustable fixed decimal points and with a printing device.

With a four-species calculating machine with preadjustable fixed decimal points and with a printing mechanism, the problem of rounding-off the last digit is considerably simplified by the fact that the product obtained when multiplying decimal fractions is automatically always rounded due to the cutting off of those decimal places after the decimal point which are not put out by the calculating machine and are not printed. In this instance, the calculating machine requires merely a device for rounding-off the product reduced in its number of digits following the decimal point, depending on the position of the preadjusted fixed decimal point.

It is, therefore, an object of the present invention to provide a calculating machine, especially a four-species calculating machine with preadjustable fixed decimal point indication and a printing mechanism, with a device for rounding-off the product of decimal fractions.

It is another object to provide a calculating machine of the type described in the preceding paragraph with a device for rounding-off the product of decimal fractions, which operates fully automatically and is relatively simple in structure.

It is a still further object of the present invention to provide a calculating machine with means for reducing the number of decimal places of the product when the decimal point has been preadjusted for more than two decimal places following the decimal point while likewise rounding-off the product in case the last digit following the decimal point which is not put out has a value between "5" and "9."

These and other objects and advantages of the invention will appear more clearly from the following specification in connection with the accompanying drawings, in which:

FIGURE 5a illustrates a further detail of the rounding-off mechanism according to the present invention;

FIGURE 6a illustrates a portion of FIGURE 6 on a larger scale than the latter and more in detail than FIGURE 6;

FIGURES 8a to 8e illustrate various positions of the decimal point adjustment knob and rounding-off adjustment knob according to the invention;

FIGURES 9a to 9e illustrate the positions of the control linkage connected to the adjusting knobs of FIGURES 8a to 8e for the various positions of these knobs illustrated in FIGURES 8a to 8e.

Figure 1:
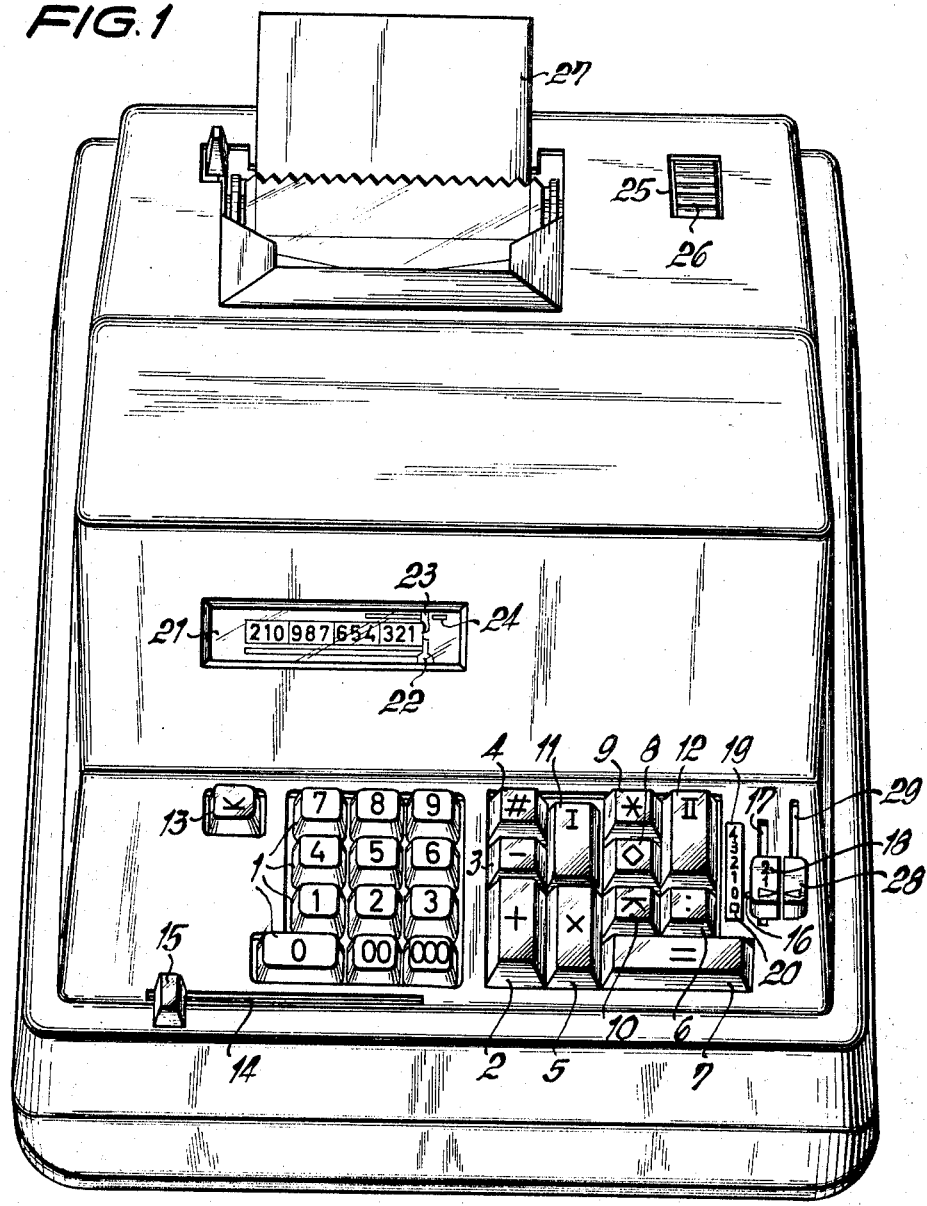
FIGURE 1 is a plan view of a four-species calculating machine with printing mechanism and with decimal point preadjusting means and a rounding-off mechanism according to the present invention.

The calculating machine according to the present invention includes a device for automatically producing a digit value, especially the value "5" and furthermore includes means adapted to enter the digit value produced in the calculating machine into one of the machine stationary gears of the calculating mechanism which is associated with the first places in the counting mechanism, without effecting a tens transfer. The machine furthermore comprises coupling means adapted to couple the digit value producing means with said entering means, a result key, program control means and release means adapted to release the coupling means upon actuation of the result key if a multiplication operation is involved. The calculating machine according to the invention also includes preselecting means adapted to alternately move said entering means into their respective working positions while also including arresting and limiting means adapted to hold said preselecting means in their ineffective position if calculations without decimal point are involved, and also adapted to release said last-mentioned means when calculating with numbers having decimal points and also adapted to permit an adjustment of said preselecting means to such an extent only that the produced digit value for the rounding-off operation is entered into that decimal place of the main accounting mechanism which is located to the right of the last digit being put out and printed in a product.

In order to be able to reduce the number of decimal places when the decimal point has been preset for more than two decimal places, the calculating machine according to the present invention is provided with devices for suppressing the output of the value and the printing of the value in one or more of the lowermost digit places, a machine actuated device which holds the devices for suppressing the output of the value and the printing of the value in their ineffective positions and displaces the same into their working position only during the output of the product. There are furthermore provided clutch means for coupling the machine actuated device with the above-mentioned devices for suppressing the output and the printing of the values in case the rounding-off preselecting means are brought into a position in which the product is to have a lower number of digits following the decimal point than the number of digits following the decimal point adjusted by the decimal point preselecting means.

In all other instances, the calculating machine is supposed to round off the product obtained when multiplying decimal fractions in the same manner as heretofore known by cutting off the unnecessary decimal places. The calculating machine according to the present invention is characterized by a low expense, simple actuation and reliable operation. A particular advantage is to be seen in the fact that the rounding-off operation does not require an extra revolution of the machine.

*General design of the calculating machine according to the invention*

Referring now to the drawings in detail and FIG. 1 thereof in particular, the calculating machine according to the present invention has its front top side provided with a tens keyboard 1 with keys designated with the numerals "1" to "9" and with the symbols "0," "00" and "000." Adjacent the right-hand side of the tens keyboard 1 there is provided a function control keyboard comprising an add key 2, a subtract key 3, a so-called non-calculating or numeral printing key 4, a multiplication key 5, a division key 6, a result key 7, a sub-total key 8, a grand total key 9 and a constant call key 10. Each of these keys has indicated thereon a symbol corresponding to its function. For purposes of calling up two storage units provided in the calculating machine according to the present invention there are provided two storage unit selector keys 11 and 12 indicated at I and II. To the left of tens keyboard 1 there is arranged a constant setting key 13 and a clearing slide 15 displaceably mounted in a slot 14 for manually moving a pin carriage (to be described later) adapted to be actuated by keyboard 1, into its starting position.

To the right of the just-described function control keyboard there is provided a decimal point adjusting knob 18 with a pointer 16 and displaceable in a slot 17, for pre-adjusting a fixed decimal point. To the left of adjusting knob 18 there is arranged a scale or graduation 19 carrying the numerals "0" to "4" in order to enable a person to read the position of the decimal point adjusted by adjusting knob 18. A mark 20 provided at the lower end of scale 19 serves for indicating the preadjustment of the machine for a division calculation with largest possible quotient.

Above tens keyboard 1 there is provided a scale 21 showing the number of places occupied in the pin carriage by means of a pointer 22 connected to said pin carriage. A movable pointer 23 is arranged on top of scale 21 and likewise indicates the position of the decimal point preadjusted by the adjusting knob 18. There is furthermore provided a mark 24 corresponding to mark 20 on scale 19. In a cutout 25 in the right-hand rearward portion of the calculating machine housing there is shown a knurled wheel 26 serving for manually adjusting a transporting roller advancing a strip of paper 27. As likewise shown in FIG. 1, to the right of adjusting knob 18 for the preadjustment of a decimal point, there is provided a further adjusting knob 28 which is displaceable in a slot 29 parallel to adjusting knob 18. Adjusting knob 28 serves in a manner to be described further below for preadjusting the machine for a desired rounding-off operation during multiplication with decimal fractions.

Figure 2:
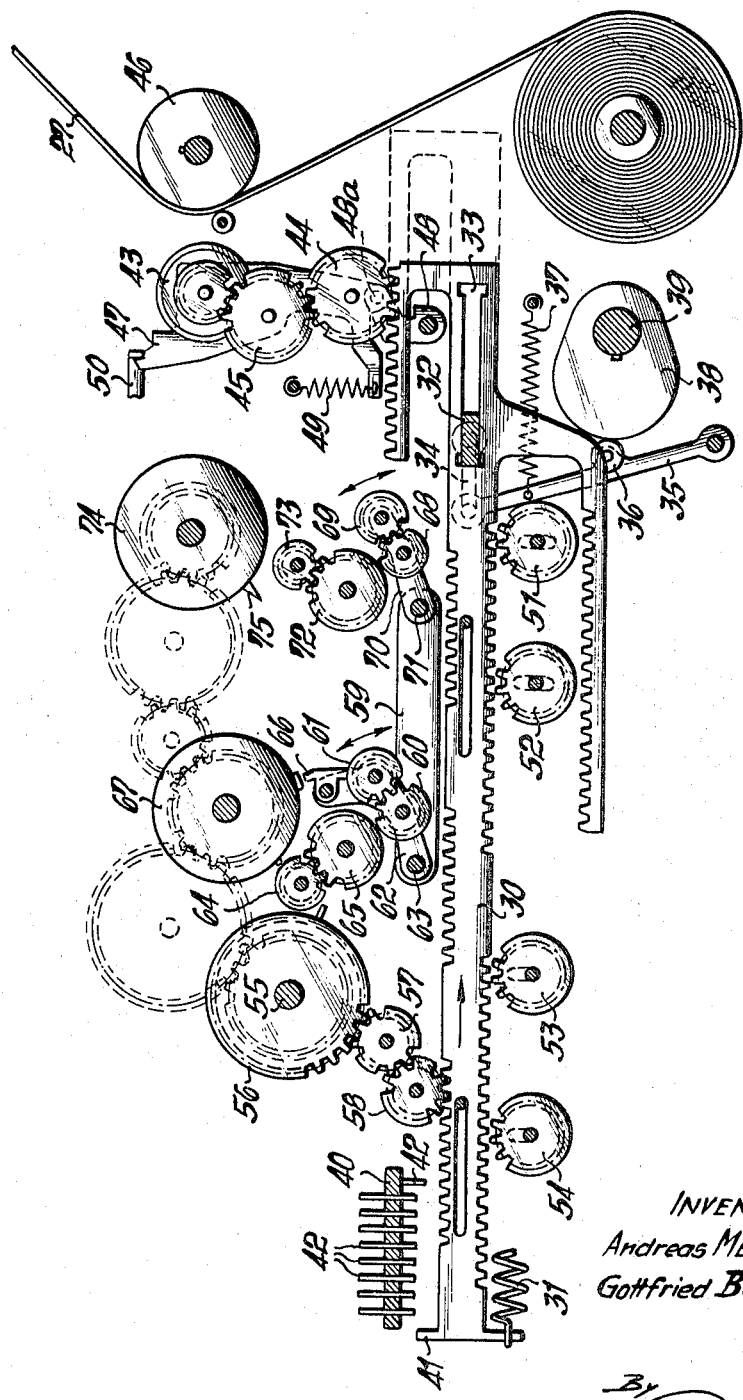
FIGURE 2 is a diagrammatic illustration of a part of the calculating mechanism of the machine according to the present invention.

FIG. 2 diagrammatically illustrates, in side elevation, the devices for the entry and output of values and for carrying out calculating operations in the machine according to the present invention, however, without the control linkage pertaining thereto. The calculating machine is provided with a number of racks 30 arranged in side-by-side relation with regard to each other. Each of said racks 30 is held in its basic position illustrated in FIG. 2 in full-lines, in engagement with a tensioning bar 32 due to the tension in one spring 31 each. Tensioning bar 32 is adapted to move in a slot 33 of racks 30 toward the rear, i.e., toward the right in the illustration of FIG. 2. Bar 32 is, through the intervention of a linkage 34 pivotally connected with a lever 35 which in turn is pivotally journalled in the calculating machine and which is held in engagement with a cam 38 through the intervention of a roller 36 and a spring 37 engaging lever 35. Cam 38 is fixedly connected with a main machine shaft 39. As will be evident from FIG. 2, during one revolution of main machine shaft 39 the tensioning bar 32 is moved toward the right and back so that in view of springs 31, racks 30 are adapted to occupy the position indicated in dash-lines in FIG. 2 in which they rest against an abutment and so that the racks may subsequently be returned to their basic position.

For purposse of receiving a value set up in a pin carriage 40, racks 30 have their front ends provided with abutments 41 by means of which they abut a correspondingly adjusted pin 42 of pin carriage 40. Racks 30 are in continuous driving connection with type wheels 43 of a printing mechanism through the intervention of transmission wheels 44, 45 so that the value received by racks 30 is printed onto the strip of paper 27 advanced in a stepwise manner over a roller 46. Type wheels 43 and transmission wheels 44, 45 are rotatably mounted on so-called printing hammers 47 which in turn are journalled in machine stationary bearing portions 48 so as to be pivotable about bolts 48a. Printing hammers 47 are subjected to the tension of springs 49 and are normally held in the ineffective position shown in FIG. 2 by locking means 50. When locking means 50 are released, printing hammers 47 hammer against roller 46 under the influence of springs 49 so that, depending on the position of type wheels 43, one of the numerals "0" to "9" may be printed. With the calculating machine according to the present invention, in a manner not illustrated in the drawings, the first four type wheels of the printing mechanism are provided with one decimal point type each which are normally arrested and which are selectively freed to be printed through the intervention of the decimal point setting linkage connected to adjusting knob 18.

Reference numerals 51 and 52 designate balancing counters I and II which may be selectively made effective through keys 11 and 12 and which are adapted to be brought into engagement with racks 30 and, more specifically, may be moved in upward or downward direction for an addition or subtraction calculation. Reference numeral 53 designates an auxiliary storage unit which is adapted to be made effective by constant setting key 13 and which may be called by depressing constant calling key 10. There is furthermore provided an auxiliary storage unit 54 which is continuously moved into the range of movement of racks 30 prior to the forward movement of the latter and prior to the backward movement thereof only upon depressing of a functional key without previous entry of a value. A stationary result register 56 provided on register shaft 55 and consisting of sprocket wheels may be coupled selectively to racks 30 through the intervention of laterally displaceable gears 57 and 58. A main counting mechanism 60, 61 provided on a displaceable register carriage 59 is arranged at a frame 62 and tiltable in downward and upward direction about round guiding means 63 serving also as a guiding means for register carriage 59. Main counting mechanism 60, 61 is, for purposes of entry and output of a value, is tilted in upward direction and for the purpose of coupling to machine stationary register 56, is tilted in upward direction into engagement with machine stationary transmission gears 64 and 65. When carrying out an addition calculation, wheels 60 of main counting mechanism 60, 61 are moved into engagement with gears 65 whereas when carrying out a subtraction calculation, the reversing gears 61 of main counting mechanism 60, 61 move into engagement with gears 65 by laterally displacing carriage 59 about half the width allotted for one digit. The calculating operation itself takes place in such a way that the values contained in wheels 56 of the stationary register are either directly entered into the wheels 60 of the main counting mechanism through the intervention of the transmission gears 64, 65 or when carrying out a subtraction calculation through the intervention of the reversing gears 61 into the main counting mechanism 60, 61. If necessary, a tens transfer is entered into the main counting mechanism 60 in a manner not illustrated in the drawings and known per se through the intervention of a tens transfer switch lever 66 and transmission gears 67 at the end of the entry of the value by the wheels of the stationary register 56 through the intervention of wheel 64 of the next higher digit. As will be explained in detail further below, the input of the value for purposes of rounding off the product from which the last digits following the decimal point have been eliminated, is likewise effected through the intervention of transmission wheels 64.

The calculating machine is furthermore provided with a revolutions counting mechanism 68, 69 which in a manner similar to that described in connection with main counting mechanism 60, 61 is arranged in register 59 and, more specifically in a frame 70 and is tiltable in upward and downward direction about round guiding means 71 which simultaneously serve as guiding means for register carriage 59. For the entry and output of values also revolutions counting mechanism 68, 69 is tilted in downward direction into the corresponding teeth of racks 30 and during the actual calculation is tilted in upward direction into engagement with machine stationary gears 72. Also into this instance, depending on whether the machine is adjusted for an addition or a subtraction calculation, the gears 68 or 69 of revolutions counting mechanism 68, 69 are brought into engagement with gears 72. The drive of revolutions counting mechanism 68, 69 is effected through the intervention of the gear transmission system illustrated in dot-dash lines in FIG. 2, which is in driving connection with register shaft 55 and through the intervention of a tooth 75 provided on a wheel 74 and cooperating with a transmission gear 73.

Figure 3:
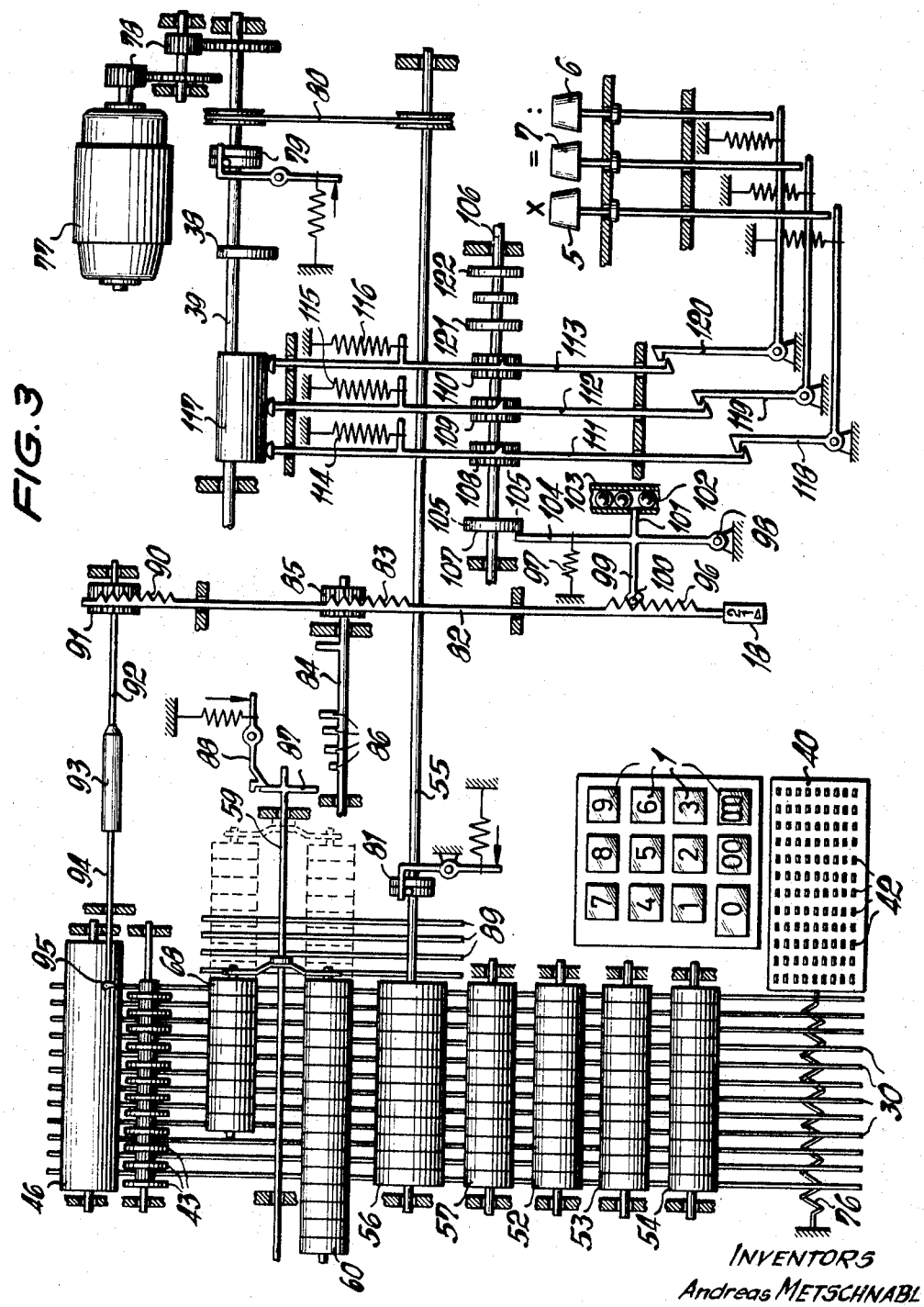
FIGURE 3 is a further diagrammatic illustration of a portion of the calculating mechanism of the machine according to the present invention.

FIG. 3 is a top view of the arrangement shown in FIG. 2 and illustrates in addition to the elements shown in FIG. 2 the drive of the calculating machine and several control devices for cooperation with the rounding-off device according to the present invention. More specifically, FIG. 3 shows again the set of wheels 60 of the main counting mechanism and the set of wheels 68 of the revolutions counting mechanism on register carriage 59. Register carriage 59 is shown in its left-hand basic position in full-lines and in dot-dash lines in its right-hand reversing position. The drive of register carriage 59 may, for instance, be effected by springs (not shown) which become alternately effective for a rightward or leftward movement of the carriage. A drive of this type has been disclosed, for instance, in our copending patent application Ser. No. 389,940 filed Aug. 17, 1964, now U.S. Pat. No. 3,279,693. These springs are tensioned with each revolution of main machine shaft 39. Pin carriage 40 into which values may be entered by depressing keys of tens keyboard 1 is subjected to the force of a spring 76, the arrangement being such that upon actuation of a key of tens keyboard 1 carrying the numerals "0" to "9," the carriage moves one step each toward the left into the range of movement of racks 30, and upon actuation of the key designated "00," by two steps, and upon actuation of the key designated "000," by three steps toward the left. The means for actuating pin carriage 40 are not shown in FIG. 3.

The drive of the calculating machine is effected by an electric motor 77 which, through the intervention of an intermediate gear 78 and a single-revolution clutch 79 known per se, drives main machine shaft 39 and furthermore, through the intervention of a belt drive 80 and a further single-revolution clutch 81, drives register shaft 55. Cam 38 provided on machine shaft 39 serves for driving tensioning bar 32, as has already been explained in connection with the description of FIG. 2.

FIG. 3 furthermore illustrates the control linkage connected to decimal point adjusting knob 18 and serving for preadjusting a fixed decimal point. Decimal point adjusting knob 18 has connected thereto a decimal point adjusting slide 82 displaceably guided in the calculating machine. Slide 82 engages a pinion 85 mounted on a decimal point abutment shaft 84 through the intervention of a serration 83. Decimal point abutment shaft 84 is provided with abutment pins 86 arranged along a helical path, in conformity with the spacing of the digits in the calculating mechanism. Pins 86 cooperate with an abutment 87 provided on register carriage 59. Reference numeral 88 designates a locking means which arrests register carriage 59 in its left-hand basic position shown in FIG. 3 and is adapted to free the same for a stepwise movement toward the right when a multiplication operation is being carried out. As has already been mentioned in the introductory portion of the specification, register carriage 59 returns to its basic left-hand position upon reaching its outermost right-hand position. In case a calculation with decimal fractions is involved, abutment 87 provided on register carriage 59 is held by one of the abutment pins 86 so that the register carriage, depending on the preselection of the decimal point, is stopped for purposes of the output of the product prior to reaching its left-hand basic position by one, two, three or four places. Following the output of the product, clearing of the main counting mechanism 60 by racks 30 is effected. In order to assure that also those wheels of the main counting mechanism 60 which protrude toward the right with regard to their basic position are returned to their basic position, four further racks 89, viz. so-called clearing racks, are provided to the right of the racks 30. After all wheels of the main counting mechanism 60 have been returned to their zero position and after the racks 30 and 89 are also returned to their basic position, register carriage 59 is released for return to its left-hand basic position by a short turning movement of abutment shaft 84 through the intervention of means (not shown in FIG. 3). The rearward portion of decimal point adjusting slide 82 is provided with a serration 90 the teeth of which are in meshing engagement with a pinion 91 which is fixedly connected with a shaft 92 leading to a worm gear 93. Worm gear 93 serves for laterally displacing a rod 94 the left-hand end of which carries a decimal point type 95. The just-mentioned elements 93 to 95 serve merely for symbolically indicating the adjustment of the decimal point at the printing mechanism during a displacement of slide 82.

Adjacent its front end, slide 82 is provided with a further serration 96 in which there is arrested a lever 99 pivotally connected at 98 through the intervention of a spring 97 and a pin 100. Lever 99 is provided with an extension 101 which, upon tilting of lever 99 in clockwise direction with regard to FIG. 3, moves between balls 102 of ball-arresting means 103. Ball arresting means 103 serves for alternately arresting the functional keys 2 to 9. Slide 82, therefore, may be displaced only when none of the keys 2 to 9 has been actuated. Lever 99 has also connected thereto a second extension 104 which, upon actuation of decimal point adjusting slide 82, moves into a recess 105 of an arresting disc 107 provided on a program control shaft 106. If the calculating machine has already started carrying out its calculating process, program control shaft 106 is rotated out of its basic position whereby slide 82 is arrested in the latest adjusted position through the intervention of arresting disc 107 and extension 104 at lever 99.

FIG. 3 furthermore diagrammatically illustrates the drive for program control shaft 106 for fully automatically carrying out multiplication and division calculations in the calculating machine. Program control shaft 106 has arranged thereon three gears 108, 109 and 110 each provided with different teeth. Gears 108, 109 and 110 are adapted to be engaged by one control tooth each arranged at slides 111, 112 and 113. Slides 111 to 113 are, through the intervention of one spring 114, 115, and 116 each urged into a direction toward a cam 117 on main machine shaft 39 and when function control keys 5, 6 and 7 are not actuated, are arrested in their ineffective position by locking means 118, 119 and 120 which are spring-urged on and adapted to be made effective by keys 5, 6 and 7. As will not be explained in detail, during subsequent actuation of multiplication key 5 and result key 7, program control shaft 106 performs a control cycle in which a multiplication and, upon subsequent actuation of the division key 6 and result key 7, a division is carried out by the calculating machine, as, for instance, disclosed in our copending patent application Ser. No. 404,980 filed Oct. 19, 1964, now U.S. Pat. No. 3,302,875. Program control shaft 106 has provided thereon, in addition to various other cams, a disc 107 for arresting slide 82 and two further discs 121 and 122. As will be shown further below, cam disc 121 serves for coupling the rounding-off device to main machine shaft 39 upon depression of result key 7, and cam disc 122 serves for carrying out the "cutting off" operation of the last digits of the decimal fraction.

Rounding-off device

Figure 4:
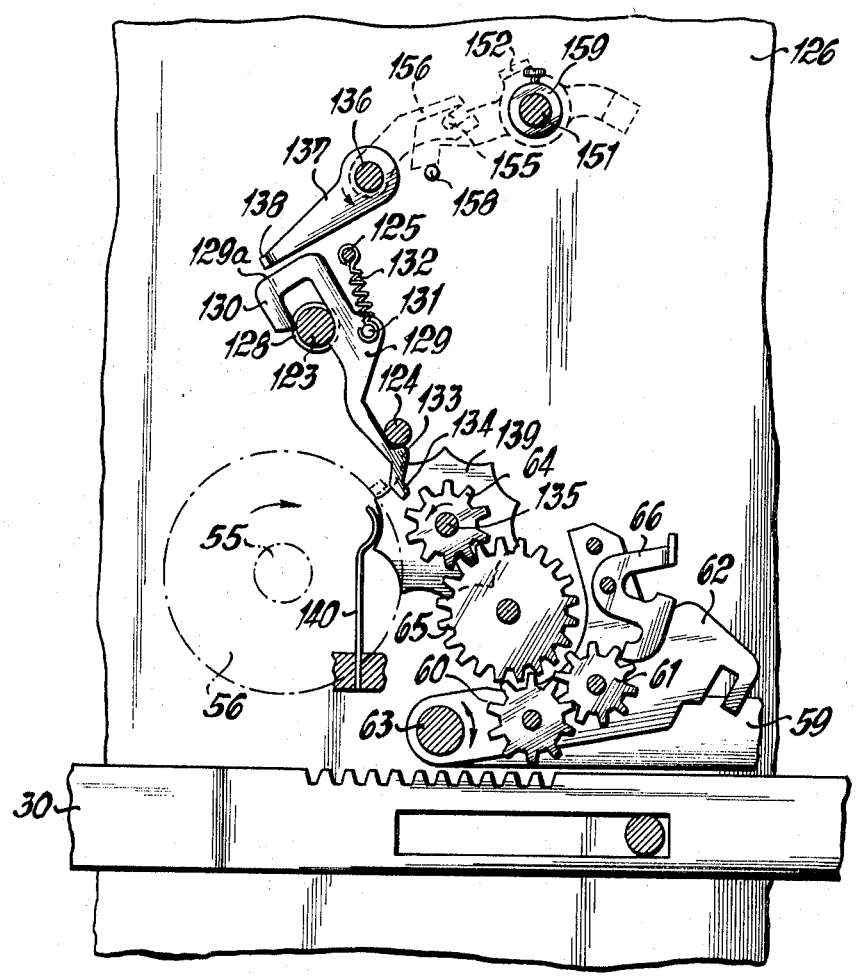
FIGURE 4 is a sectional side elevation of a portion of the calculating machine, illustrating the rounding-off device according to the present invention.
Figure 5:
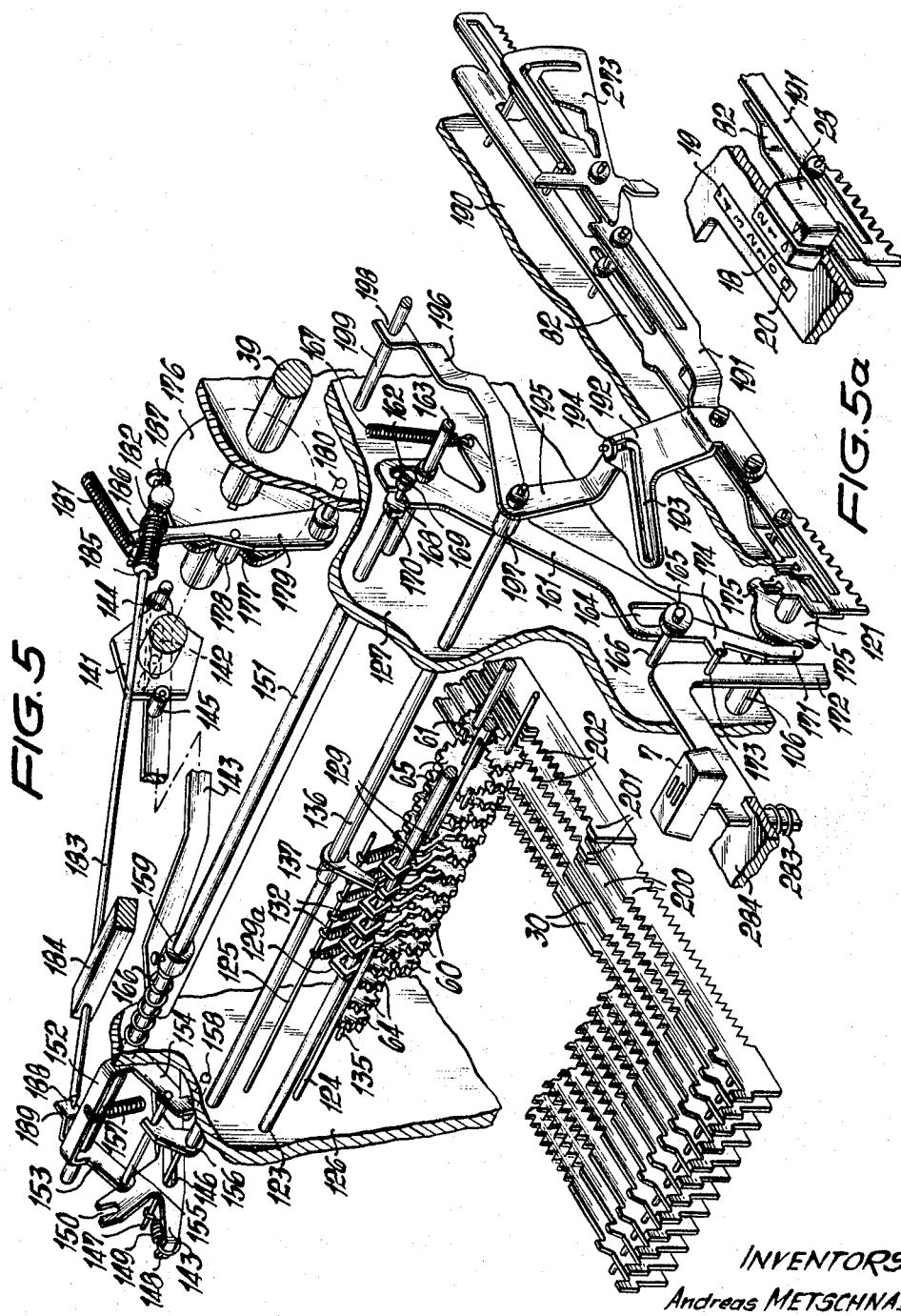
FIGURE 5 is an isometric view of a portion of the calculating machine with the rounding-off mechanism according to the present invention.

Referring now more specifically to FIGS. 4 and 5, circular rods 123, 124 and 125 are fixedly arranged above gears or wheels 64 of the calculating machine between two walls 126 and 127 of the machine frame. Rod 123, which is somewhat thicker than the other rods 124 and 125, has notches 128 provided above the last six right-hand wheels 64. One tappet 129 each is with its U-shaped upper portion 130 guided in a respective notch 128 so as to be slidable in downward direction and rotatable in clockwise direction. Intermediate a stud 131 at tappets 129 and rod 125 there are provided tension springs 132 which pull said tappets in upward direction into their basic positions while an abutment 133 provided at each tappet 129 rests against rod 124. The lower end of tappet 129 is formed by a tooth 134 which in the basic position of tappet 129 is located somewhat outside the circumference of wheels or gears 64 eccentrically with regard to shaft 135 and offset toward the front in the direction toward register shaft 55. Above tappets 129 there is displaceably and rotatably journalled in walls 126, 127 a control shaft 136 which protrudes on both sides beyond said walls and which has fixedly connected thereto a control lever 137 the bent-off front end 138 of which is located above plane surfaces 129a provided on tappets 129.

As has already been mentioned before, wheels 64 serve for receiving the values from the wheels 56 of the machine stationary register and from the likewise machine stationary tens transfer mechanism and transferring the same into the main counting mechanism 60 provided in register carriage 59, while the wheels 64 are always rotated in the direction of the arrow shown in FIG. 4. As will be evident from FIG. 4, each wheel 64 is provided with a notched disc 139 engaged by a spring 140. Disc 139 and spring 140 serve as safety device for preventing over-turning.

As will be described later in connection with FIG. 5, during a revolution of main machine shaft 39 control impulses are produced in the machine which may be transmitted to control shaft 136 and which may rotate the same in counter-clockwise direction with regard to FIG. 4. Due to a control impulse of this type, the respective tappet 129 is moved in a direction toward wheel 64 while tooth 134 engages a tooth-gap of the corresponding wheel 64 and tappet 129 rests against the circumference of the corresponding wheel of register 56. In this way, wheel 64 with its ten teeth and thereby also the corresponding wheel 60 of the main counting mechanism, is advanced in positive direction by one tooth only. For purposes of entering the numeral "5," therefore, five control impulses have to be transmitted from shaft 136 to tappet 129. FIG. 4 furthermore shows frame 62 of main counting mechanism 60, 61 and a tens transfer lever 66.

As shown in FIG. 5, the left-hand end of main machine shaft 39 has fixedly connected thereto a five-cornered cam disc 141 while behind this disc there is displaceable journalled a control slide 143 through the intervention of an oblong hole 142. Slide 143 is provided with a pin 144 engaging disc 141 and with a roller 145. The front end of control slide 143 is, through the intervention of an oblong hole 146 journalled at a machine stationary pin 147 while between pin 147 and a bent-off extension 148 at slide 143 there is provided a tension spring 149 which holds roller 145 at slide 143 is engagement with cam disc 141. The front end of control slide 143 is furthermore provided with a clutch jaw 150 extending in upward direction. As will be seen from FIG. 5, during one revolution of main machine shaft 39, slide 143 carries out five control movements or impulses toward the left front portion of the machine while spring 149 keeps slide 143 with roller 145 in engagement with cam disc 141.

The following arrangement serves for transmitting the control movement of control slide 143 to control lever 137: Above control shaft 136 a coupling shaft 151 is displaceably and rotatably journalled in frame walls 126, 127 and protrudes on both sides beyond these walls. The left-hand end of shaft 151 which protrudes beyond wall 126 is fixedly connected with a coupling bow 152. This coupling bow 152 is provided with two parallel arms 153, 154 which have connected thereto a coupling pin 155 the left front end of which protruding beyond arm 153 is located in front of clutch jaw 150 of control slide 143. The central portion of coupling pin 155 is engaged by a second coupling jaw 156 which is fixedly connected with the left-hand end of control shaft 136. A tension spring 157 engaging bow 152 keeps arm 154 of bow 152 in engagement with a pin 158 fixedly connected to the left-hand frame wall 126 and thereby also arrests control lever 137 in its basic position through the intervention of bow 152, coupling pin 155 and jaw 156. In this basic position end 138 of lever 137 is located slightly above surface 128a of control tappets 129.

Between the left-hand frame wall 126 and a sleeve 159 fixedly mounted on shaft 151 there is provided a pressure spring 160 which holds bow 152 in engagement with the lefthand frame wall 126 and also holds shaft 151 in disengaged position in which pin 155 does not engage jaw 150 at slide 143. In this position, shaft 151 has that end thereof which protrudes beyond frame wall 127 toward the right, arrested by a slide 161. Slide 161 is journalled in such a way that it is displaceable in downward direction along a pin 163 provided with a collar at the outside of the right-hand frame wall 127 at the upper end thereof through the intervention of an oblong hole 162. The journalling of slide 161 is such that it is furthermore displaceable in downward direction and also tiltable toward the front adjacent its lower end by means of a somewhat wider oblong hole 164 adjacent a pin 166 provided with a disc 165. A tension spring 167 keeps slide 161 in its basic position shown in FIG. 5, in which said slide rests with a recess 168 at the shank of a screw 169 which is screwed into the front end of coupling shaft 151 and is locked thereto by a lock-nut 170. Thus, in the illustrated position of slide 161 coupling shaft 151 is prevented from moving toward the left by the head of screw 169. In this position of slide 161, the lower end 171 thereof rests against the lower portion of the control disc 121 provided on control shaft 106 and referred to in the description of FIG. 3. To the left and the front of end 171 of slide 161 there is located a shank 172 of result key 7 which in a manner known per se is journalled in a wall 284 of the machine frame so as to be displaceable in downward direction against the thrust of a spring 283. Shank 172 has arranged thereon a lateral pin 173 which upon depression of result key 7 passes in front of an extension 174 at slide 161 without the latter being taken along during the movement of shank 172. Control disc 121 is provided with two cam sections 175 which are moved behind end 171 of slide 161 only when for purposes of carrying out a multiplication operation during the entry of the multiplicand into register 56, multiplication key 5 is depressed and control shaft 106 is rotated to a corresponding extent, as has been explained in connection with the description of FIG. 3. If now, following the entry of the multiplicand, the result key 7 is depressed, extension 174 which has become dislaced below pin 173, takes along slide 161 and moves the same in downward direction and also releases coupling shaft 151. It will be evident from FIG 5 that it is possible only during the entry of the multiplier into the calculating machine to enter a value into a decimal place of the main counting mechanism 60 for rounding off a value.

The displacement of coupling shaft 151 for coupling coupling pin 155 with jaw 150 is effected by the following arrangement provided in the calculating machine according to the present invention. Main machine shaft 39 has connected thereto a cam disc 176 provided with a notch 177 which is engaged by a roller 178 connected to a lever 179 which is pivotal about a stud 180 and which is held in engagement with cam disc 176 by means of a spring 181. This so-called roller lever 179 serves for moving main machine shaft 39 exactly into its starting position following engagement of the single-revolution clutch. The upper end of lever 179 has fixedly mounted thereon a bolt 182 which is approximately parallel to the axis of stud 180. Bolt 182 has a central bore in which is guided a relatively long control pin 183. Further guiding means 184 are provided at the left-hand front end of pin 183. Adjacent its right-hand rearward portion and immediately in front of bolt 182, pin 183 is provided with a fixed collar 185. A pressure spring 186 is provided between collar 185 and bolt 182 while the rearward end portion of pin 183 is likewise provided with a collar 187 which rests against bolt 182 by means of spring 186. Pin 183 is adapted to be displaced toward the right to a certain extent upon compression of spring 186. The front left-hand end of pin 183 is provided with a tip 188 while inclined surface 189 arranged at an extension of coupling bow 152 is located opposite said tip 188.

The operation of control pin 183 is as follows: Right at the start of a revolution of main machine shaft 39 roller lever 179 is pivoted toward the left so that pin 183 engages the inclined surface 189 with its tip 188. If coupling shaft 151 is arrested by slide 161, shaft 151 and also bow 152 remain in the position shown in FIG. 5 and merely control pin 183 slides in bolt 182 while compressing spring 186. If, however, coupling shaft 151 is released by slide 161, control pin 183 with its tip 188 moves coupling bow 182 and shaft 151 toward the left so that the left-hand end of coupling pin 155 engages coupling jaw 150 of slide 143. Thus, in this instance, the control movements transmitted from cam disc 141 to control slide 143 are transmitted through the intervention of pin 155 to the second jaw 156 and to control lever 137 which, therefore, during a rotation of main machine shaft 39, is five times tilted in counter-clockwise direction with regard to FIG. 5. Following completion of the revolution of main machine shaft 39, roller lever 179 with its roller 178 engages again notch 177 so that control pin 183 releases bow 152 which, due to spring 160 with its shaft 151 occupies again the basic position shown in FIG. 5 in which slide 161 is interlocked with coupling shaft 151.

*Actuation of the rounding-off device:*

FIG. 5 illustrates control lever 137 provided on control shaft 106 in its basic or starting position in which it is, when looking from the right, located between the first and second control tappets 129 in its ineffective position. In order to be able to adjust lever 137 in conformity with the pre-selected decimal point into a corresponding position above one of tappets 129, the following devices are provided: As has already been shown in FIGS. 1 and 3, the calculating machine is provided with a decimal point preselecting slide 82 provided with a knob 18, said slide being displaceably journalled at the right-hand side of a frame wall 190 by means of bolts and oblong holes. To the right of slide 82 there is provided a second slide 191 for preselecting a rounding-off operation. This slide 191 will henceforth be called "rounding-off" slide. Rounding-off slide 191 carries the adjusting knob 28 to the right of the adjusting knob 18. Slide 191 has connected thereto a slotted link 192 the slide 193 of which has guided therein a stud 194 which is fixedly connected to the bent-off end of a two-arm lever 195, 196. Lever 195, 196 is, through the intervention of a sleeve 197, rotatably connected to the right-hand end of control shaft 136. By means of a fork 198 provided at the end of lever arm 196, lever 195, 196 is guided by a pin 199 of frame wall 127.

As shown in FIGS. 1 and 5a, adjusting knob 18 for preselecting the position of the decimal point may be displaced toward the front of the calculating machine to a mark 20 and toward the rear into four different positions corresponding to one to four decimal places following the decimal point. Knobs 18 and 28 are provided with wedge-shaped marks pointing toward each other and knob 18 is in addition thereto provided with numerals "1" and "2" behind the wedge-shaped mark. If rounding-off slide 11 is displaced toward the rear together with decimal point adjusting slide 82 in such a way that control lever 137 is, through the intervention of slotted link 192 and slot 193 brought into a position above the first, second, third and fourth tappet 129 respectively, which means that in the respective first place of the main counting mechanism 60 which is not taken into consideration at the output of the product, the value "5" is entered if, during the entry of the multiplier, result key 7 is actuated. In addition thereto, it is intended to displace the right-hand adjusting knob 28 toward the rear by one step if the adjusting knob 18 has its wedge-shaped mark in the position "3" on scale 19, and to displace the adjusting knob 28 by two steps if adjusting knob 18 is in the position marked "4." Thus, the wedge-shaped mark on knob 28 points to numeral "1" or "2" respectively, on knob 18. It is intended in these positions of rounding-off slide 191 to suppress respectively one or two of the preadjusted decimal places during the output of the product and during the printing of the product while, however, the calculated product is rounded off, if necessary, if the first decimal place following the decimal point which is not put out or printed has a value between "5" and "9." In these instances, control lever 137 is respectively located above the second and first left-hand tappet 129 of the total of six tappets 129 provided in the calculating machine.

*Device for cutting off and preventing the printing of preadjusted decimal places following the decimal point:*

Figure 6:
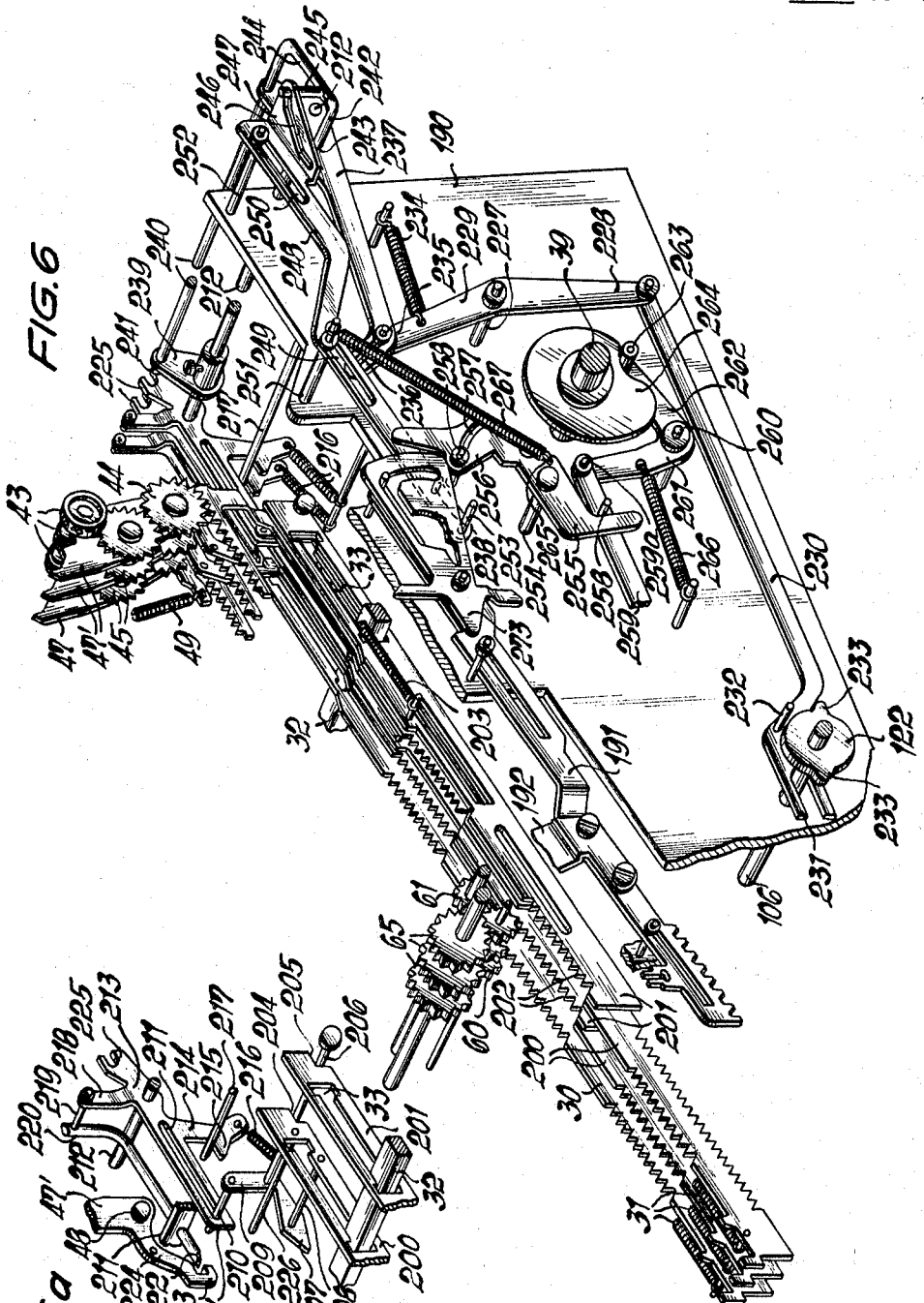
FIGURE 6 is an isometric view of another portion of the calculating machine according to the present invention.

In order to be able, if necessary, to effect a cutting off of preadjusted decimal places following the decimal point during the output of the product, the following devices are provided in the calculating machine according to the present invention, with reference to FIGS. 6 and 6a: Instead of the previously described racks 30, the first two right-hand places are provided with two racks each, viz. a main rack 200 and a shorter auxiliary rack 201 located to the right of the respective main rack 200. Racks 200 differ from racks 30 in that they do not have teeth within the range of main counting mechanism 60 whereas the auxiliary racks 201 have teeth 202 only within the range of main counting mechanism 30. Main racks 200 and auxiliary racks 20 are, in a manner, similar to that described in connection with racks 30, provided with oblong holes 33 adjacent their rearward end portions. Tensioning bar 32 is adapted to move with these oblong holes 33 toward the rear. Main racks 200 are held in engagement with bar 32 through the intervention of springs 31 while similar springs 203 engage the auxiliary racks 201. As is particularly clearly shown in FIG. 6a main and auxiliary racks 200, 201 are provided with one recess 204, 205 each within the range of their lower rearward edges. A coupling bolt 206 is located in these recesses 204 and 205 and is connected to a coupling latch 207 which is rotatably arranged on a bolt 208 fixedly connected to main rack 200. Latch 207 has its upwardly directed end portion 209 provided with a stud 210 which enters an oblong hole 211 of a multi-arm arresting lever 213 rotatably journalled on a shaft 212.

Each arresting lever 213 includes a downwardly directed extension 214 with an abutment 215. Extension 214 is engaged by a spring 213 in its basic or starting position shown in FIG. 6a in which abutment 215 rests against a machine stationary rod 217. A short lever arm 218 of arresting lever 213, which extends in upward direction, is provided with a bolt 219 having pivotally journalled thereon an arresting rod 220. Rod 220 is displaceably journalled adjacent its front end in a machine stationary guiding means 221 while the front end proper of rod 220 is provided with a recess or notch 222 which is located in the same plane and only slightly spaced from the hook-shaped end 223 of a lever arm 224 of the first two printing hammers 47'. Printing hammers 47' do not differ in other respects from printing hammers 47 described in connection with FIG. 2. Each of the two arresting levers 213 is provided with a coupling jaw 225 through the intervention of which arresting levers 213 may be rotated to a slight extent in counter-clockwise direction with regard to FIGS. 6 and 6a. It may be mentioned that at main rack 200, above bolt 208, there is provided a so-called arresting bolt 226 which is located slightly below lever 213 in the basic position shown in the drawing which, however, will engage the front edge 213' if lever 213 is rotated.

FIGS. 6, 6a show that the racks consisting of main racks 200 and auxiliary racks 201 as well as printing hammers 47' operate in their basic position in the same manner as the corresponding elements of the other places in the calculating machine, viz. the racks 30 and printing hammers 47. During the return movement of bar 32, racks 200 and 201 move toward the rear, during which movement they are coupled to each other through the intervention of bolts 206 connected to coupling latch 207. During this movement stud 210 slides in oblong hole 211 of lever 213 toward the rear while arresting bolt 226 moves underneath lever 213. If, however, arresting lever 213 is rotated so as to be tilted downwardly through the intervention of jaw 225, the following events will take place: Bolt 206 is removed from recesses 204 and 205 in downward direction and front edge 213' of lever 213 abuts against arresting bolt 226 at main rack 200 while the front end 222 of arresting rod 220 engages the U-shaped end 223 of arm 224 of printing hammer 47'. Consequently, during the return movement of bar 32 lever 213 holds main rack 200 and arresting rod 220 holds printing hammer 47' so that neither an imput nor a printing of the value in the respective decimal place can be effected. However, auxiliary rack 201 may move toward the rear in view of spring 203, thereby clearing the value calculated in this decimal place of the main counting mechanism.

*Drive and adjustment of the cutting off and print preventing device according to the present invention*

The following arrangement serves for rotating arresting lever 213: A two-arm lever 228, 229 is rotatably journalled at the outside of the right-hand frame wall 190 about a bolt 227. The lower lever arm 228 of the two-arm lever 228, 229 is pivotally connected with a pushrod 230 the fork-shaped front end 231 of which engages the program control shaft 106 while a stud 232 of rod 230 rests against control disc 122 described in connection with FIG. 3. Control disc 122 is provided with two cam portions 233 the position of which is so selected that only during the output of the product is one of the cam portions 233 located below stud 232 and thereby rotates lever 228, 229 in counter-clockwise direction with regard to FIG. 6. By means of a spring 234 engaging lever arm 229, rod 230 is held in engagement with control disc 122 and cam portions 233. The upper end of lever arm 229 has a stud 235 located in an oblong hole 236 which is provided in an end portion of lever 237, which extends in upward direction. Lever 237 is fixedly connected to shaft 212 of arresting lever 213, said shaft 212 being rotatably journalled in frame walls 127, 190. Shaft 212 has furthermore fixedly mounted thereon a lever 239 in which is guided a coupling rod 240 which is displaceable therein in axial direction and which is also displaceably journalled in an extension of lever 237. The left-hand end 241 of rod 240 is, in its basic position, located to the right of jaw 225 of the first arresting lever 213. The right-hand end of rod 240 which protrudes beyond lever 237 is bent twice by 90° so as to be U-shaped, the arrangement being such that end 242 of rod 240 is guided in a bore 243 of lever 237. Rod 240 has a portion 244 thereof which interconnects portions 240, 242 provided with a pin 245 projecting in upward direction. Pin 245 extends into a slot 246 of a slotted link 247 which is connected to the rearward end of a rod 248 which is displaceably journalled at the right-hand side of frame wall 190 through the intervention of oblong holes 249, 250 and pins 251, 252. The front end of rod 248 has connected thereto an abutment pin 253 and a bolt 238.

As will be seen from FIG. 6, when displacing rod 248 from its basic position shown in the drawing toward the rear, in an intermediate position of pin 245 in slot 246, coupling rod 240 will engage the first jaw 225 and in a rearward end position it will engage the jaws 225 of both arresting levers 213. It will furthermore be seen from FIG. 6 that during rotation of lever 228, 229 in view of control disc 122 and its cam portions 233, the lever 237 is rotated in counter-clockwise direction through the intervention of pin 237 and oblong hole 236 and that thereby coupling rod 240 is likewise rotated in counter-clockwise direction about shaft 212. Thus, during the output of the product and with coupling rod 240 in coupled position, depending on the position of rod 248, the entry of the value into the printing mechanism and a printing thereof may be prevented in none of the decimal places, or in one or in two decimal places.

The adjustment of rod 248 is automatically effected by the following arrangement: A two-arm lever 255, 256 is rotatably journalled on a bolt 254. Lever arm 256 is guided by means of an oblong hole 257 at a pin 258 and the upper end of lever arm 256 is located somewhat to the rear of bolt 238 provided at rod 248 and within the range of movement of bolt 238. The lower lever arm 255 engages a rod 259 in front of pin 258, said rod 259 being pivotally journalled at 259a at an angle lever 261, 262 rotatable about a stud 260. Lever arm 262 carries a roller 263 at one end which rests against a cam disc 264 of main machine shaft 39 under the influence of a spring 266 engaging lever arm 261. Between an eye 265 at lever 255, 256 and the machine stationary pin 251 there is arranged a further tension spring 267. The linkage consisting of cam disc 264, lever 261, 262 and rod 259 serves for moving the main counting mechanism 60 during the output of the product into racks 30, 201 or 89. Simultaneously, lever 255, 256 is released through the intervention of stud 258 so that tension spring 265 may rotate the lever in counter-clockwise direction with regard to FIG. 6 whereby the upper end of lever arm 256 will come into engagement with pin 238 of rod 248. Thus, spring 267 tends to displace rod 248 toward the left almost to such an extent that coupling rod 240, 241 will occupy its disengaged position through the intervention of guiding slot 246.

In order to be able to preadjust the above-described arrangement for carrying out a rounding-off operation, a cutting off of calculated decimal places following the decimal point, depending on the position of the decimal point adjusting linkage, in a foolproof manner, the calculating machine according to the present invention is provided with the following mechanism, to be described in connection with FIGS. 7 and 8a to 8e.

Figure 7:
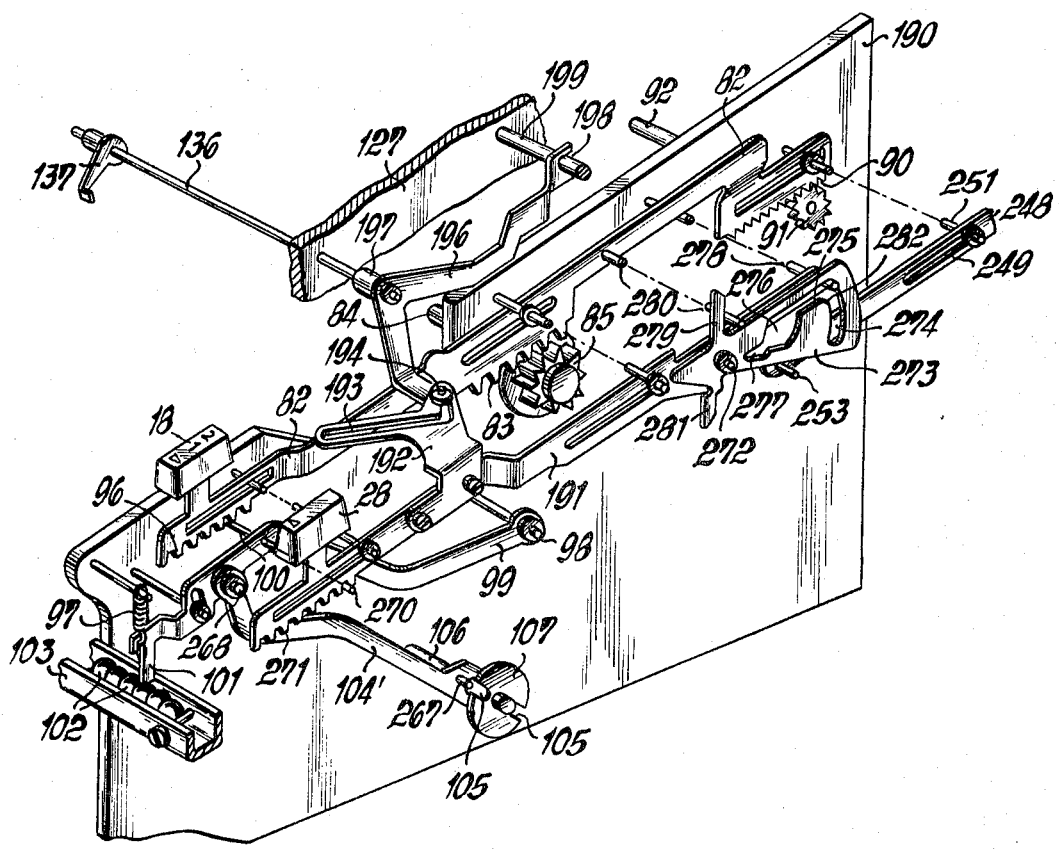
FIGURE 7 represents an exposed view of the adjusting linkage for preselecting the decimal point together with further mechanisms provided in accordance with the present invention for "rounding off" and "cutting off" decimal places.

As has already been described in connection with FIG. 3, the decimal point adjusting slide 82 is adapted to be arrested on one hand by means of a ball arresting means 102, 103, and on the other hand by means of an arresting disc 107, 105 arranged on program control shaft 106 so that slide 82 may only be actuated at the start of a calculating operation. FIG. 7 shows an isometric view of the previously described arresting means in which elements performing the same function carry the same reference numerals as in FIG. 3. Arresting lever 99 rotatable about stud 98 extends with an extension 101 between balls 102 in channel member 103 and is held against the serration 96 of slide 82 through the intervention of pin 100 and spring 97. An extension 104' is pivotally connected to a stud 268 on lever 99 so that during a displacement of slide 82, lever 99 may enter with a pin 267 into one of the notches 105 of arresting disc 107. The arresting means employed in connection with slide 82 are also employed for arresting the "rounding-off slide" 191. For this purpose, pin 100 of lever 99 has an extension 270 which engages the teeth of a serration 271 provided at slide 191. Thus, slide 191 may only be displaced if the calculating machine is in its basic position. For the further coordination of slide 191 with slide 82, slide 191 is provided with a slotted disc 273 which is rotatable about a stud 272. Disc 273 has its rearward widened portion provided with a circular arch-shaped guiding slide 274 which is followed by a straight slot portion 275 extending at the upper end of disc 273 toward the front. Slot portion 275, in turn, is followed by a widened slot portion 276 extending further toward the front and in downward direction and is furthermore followed by a narrowing slot portion 277. In the basic position of slides 82 and 91, disc 273 occupies the position shown in FIG. 7 in which a pin 278 connected to frame wall 190 is located within the range at that portion of the slot in disc 273 where slot portions 274 and 275 merge. In this position, disc 273 which is rotatable about stud 273 rests with its rearward portion on pin 278 due to its own weight. Disc 273 is furthermore provided with an abutment 279 extending in upward direction and above stud 272. A pin 280 connected to slide 82 rests against abutment 279 from the rear in the basic position shown in FIG. 7. Furthermore, disc 273 is provided with an abutment 281 which is located below stud 272 and somewhat offset toward the left and the rear with regard to frame wall 190 and which extends in downward direction. In the basic position shown in FIG. 7, abutment 281 is still located outside the range of movement of pin 253 provided on rod 248, however, it may be moved in the range of movement of the same.

The operation of disc 273 may be explained with reference to FIGS. 7 and 8a to 8e. In the basic position according to FIG. 7, rounding-off slide 191 is arrested by pin 280 at slide 82 and abutment 279 on disc 273 on one hand, and by the machine stationary pin 278 located adjacent surface 282 on the other hand, due to the fact that during a displacement of knob 28 toward the rear, surface 282 is pressed against pin 278. If knob 18 is adjusted for the position designated with the mark 20 on scale 19 (i.e. for a division with largest possible quotient), plate 273 is rotated upwardly through the intervention of pin 280 and abutment 279, so that pin 278 will be located in slot portion 274 at the lower portion thereof. In both instances, slide 191 is arrested in its basic or starting position.

If now, decimal point adjusting slide 82 is moved toward the rear into one of the four positions indicated on scale 19 for calculation with decimal numbers having one to four decimal places, rounding-off slide 191 may remain in its basic position. However, in the position of slide 82 for the decimal positions "1" and "2" it may not be moved beyond these positions since, in this instance, as shown in FIG. 8a, pin 278 is still located within slot portion 275, thus preventing a rotation of disc 273. If, however, slide 82 reaches the position shown in FIG. 8b, slide 191 may be moved by an additional step toward the rear into the position shown in FIG. 8c. In this position of disc 273, the lower abutment 281 is already within the range of movement of pin 253 of rod 248 whereby the latter is brought into a center position at the beginning of the machine cycle by means of lever 255, 256 (FIG. 6) in which coupling rod 240 is already located with its end 241 in the first jaw 225. Therefore, during the output of the product, the third decimal place following the decimal point is eliminated. However, as will be evident from FIG. 5, the entry of a value for purposes of rounding-off in the third decimal place to the right of the decimal point may be effected. If decimal point adjusting slide 82 is in its rearmost position, slide 191 may be displaced by one or two places toward the rear whereby disc 273 occupies one or the other of the positions shown in FIGS. 8d and 8e. In the position shown in FIG. 8d, abutment 281 limits the movement of rod 248 toward the left to such an extent that only in the first right-hand decimal place is an output and printing of the value prevented, as was the case in the position shown in FIG. 8a. In the position shown in FIG. 8e, abutment 281 is displaced toward the right to such an extent that during the output of the product two decimal places are cut off. Also in this instance, a rounding-off of the calculated product is effected with certain values in the first decimal place following the decimal point, which is not printed, in a manner explained previously in the specification.

It should be mentioned that in the positions of slide 82 and 191 shown in FIGS. 8c and 8e during a "sensing" of the location of disc 273 by lever 255, 256 released by rod 259, spring 267 attempts to rotate disc 273 in clockwise direction, i.e. to move slide 191 into its starting position. This, however, is not possible for the same reason that during the output of the product slide 82 and slide 191 is arrested by ball arresting means 192, 193 and control disc 107. Following completion of the calculation, coupling rod 240 remains in its coupled position in which it engages one or both of the two jaws 225. This, however, is of no consequence inasmuch as with each following revolution of main machine shaft 39, the above-mentioned cutting off device is not made effective by control disc 122 and will become effective only during the following output of the product.

It is, of course, to be understood, that the present invention is by no means limited to the particular constructions shown in the drawings, but also comprises any modifications within the scope of the appended claims.

What is claimed is:

1. In a printing calculator of the ten digit key, four-function type having a transversely moveable pin carriage, longitudinally displaceable racks for picking up values from the pin carriage, a main counting mechanism comprising a plurality of input wheels and operable to receive values from said racks and moveable transversely, storage unit means, and first preselecting means for selecting a decimal point position, said first preselecting means being adjustable only prior to a calculating operation; means for producing a digit value, input means for entering said digit value into a selected one of said input wheels for rounding off purposes, normally disengaged coupling means for coupling said digit producing means to said input means, a result key actuatable for initiating a calculating operation, release means operated by said result key and operable to release said coupling means for movement to engaged position, second preselecting means also adjustable only prior to a calculating operation and connected to said input means for positioning said input means in operative alignment with a selected one of said input wheels located immediately rightwardly of the input wheel pertaining to the last decimal place being printed, arresting means operable to hold said coupling means in ineffective position during calculations not involving a decimal point and operable during calculations involving a decimal point to permit said coupling means to actuate said input means to insert said digit value into said selected input wheel, a printing mechanism for each column of digits, and means operable for preventing the printing mechanisms located rightwardly of the rightwardmost decimal digit to be printed, and means interconnecting said first and second preselecting means and controlling the adjustability of said second preselecting means relative to said first preselecting means.

2. A calculator according to claim 1 in which said means for producing a digit value produces a digit value of 5.

3. A calculator according to claim 1 in which said means for producing a digit value produces a digit value of 5 and includes a 5 sided cam driven through one revolution during a cycle, a reciprocable slide bar having means operatively engaging said cam, said coupling means including a jaw portion on said slide bar and a pin engaging said input means and engageable with said jaw portion, said pin and jaw portion being movable laterally into engaged and disengaged positions.

4. A calculator according to claim 3 in which said input means comprises a shaft pivotally and axially moveably mounted in said calculator, said second preselecting means being connected to one end of said shaft for effecting axial shifting thereof, and a jaw element on the other end of said shaft drivingly engaging said pin and slidable therealong as said shaft shifts axially.

5. A calculator according to claim 3 in which said input means comprises a shaft pivotally and axially moveably mounted in said calculator, said second preselecting means being connected to one end of said shaft for effecting axial shifting thereof, and a jaw element on the other end of said shaft drivingly engaging said pin and slidable therealong as said shaft shifts axially, a tappet associated with each input wheel having means to engage the pertaining wheel and index the wheel an amount equal to unity upon actuation of the tappet, spring means urging each tapppet toward retracted position, a striking lever on said shaft for striking a selected one of said tappets in conformity with the axially adjusted position of the shaft.

6. A calculator according to claim 3 in which said input means comprises a shaft pivotally and axially moveably mounted in said calculator, said second preselecting means being connected to one end of said shaft for effecting axial shifting thereof, and a jaw element on the other end of said shaft drivingly engaging said pin and slidable therealong as said shaft shifts axially, a tappet associated with each input wheel having means to engage the pertaining wheel and index the wheel an amount equal to unity upon actuation of the tappet, spring means urging each tappet toward retracted position, a striking lever on said shaft for striking a selected one of said tappets in conformity with the axially adjusted position of the shaft, each tappet including an abutment area, and stationary abutment means in said calculator engageable by said abutment areas in the retracted positions of the tappets.

7. A calculator according to claim 1 in which said means for producing a digit value produces a digit value of 5, and includes a 5 sided cam driven through one revolution during a cycle, a reciprocable slide bar having means operatively engaging said cam, said coupling means including a jaw portion on said slide bar, a coupling shaft reciprocable and rotatable in said calculator and extending laterally to said slide bar, a member fixed to said coupling shaft and a pin in said member engageable with said jaw portion, spring means biasing said coupling shaft toward disengaged position wherein said pin is separated from said jaw portion, and a latch element to latch said coupling shaft in said disengaged position.

8. A calculator according to claim 1 in which said means for producing a digit value produces a digit value of 5, and includes a 5 sided cam driven through one revolution during a cycle, a reciprocable slide bar having means operatively engaging said cam, said coupling means including a jaw portion on said slide bar, a coupling shaft reciprocable and rotatable in said calculator and extending laterally to said slide bar, a member fixed to said coupling shaft and a pin in said member engageable with said jaw portion, spring means biasing said coupling shaft toward disengaged position wherein said pin is separated from said jaw portion, and a latch element to latch said coupling shaft in said disengaged position, said calculator including a multiplication key, normally ineffective control means operable by said result key to move said latch element into ineffective position, and means operated by said multiplication key for making said control means effective whereby operation of said result key following operation of said multiplication key will release said coupling shaft from its disengaged position.

9. A calculator according to claim 1 in which said means for producing a digit value produces a digit value of 5, and includes a 5 sided cam driven through one revolution during a cycle, a reciprocable slide bar having means operatively engaging said cam, said coupling means including a jaw portion on said slide bar, a coupling shaft reciprocable and rotatable in said calculator and extending laterally to said slide bar, a member fixed to said coupling shaft and a pin in said member engageable with said jaw portion, spring means biasing said coupling shaft toward disengaged position wherein said pin is separated from said jaw portion, and a latch element to latch said coupling shaft in said disengaged position, said calculator including a multiplication key, normally ineffective control means operable by said result key to move said latch element into ineffective position, and means operated by said multiplication key for making said control means effective whereby operation of said result key following operation of said multiplication key will release said coupling shaft from its disengaged position, an abutment pin in the calculator, said member being biased to engage said abutment pin and thereby holding the said pin therein in alignment with said jaw portion of said slide bar.

10. A calculator according to claim 1 in which said means for producing a digit value produces a digit value of 5, and includes a 5 sided cam driven through one revolution during a cycle, a reciprocable slide bar having means operatively engaging said cam, said coupling means including a jaw portion on said slide bar, a coupling shaft reciprocable and rotatable in said calculator and extending laterally to said slide bar, a member fixed to said coupling shaft and a pin in said member engageable with said jaw portion, spring means biasing said coupling shaft toward disengaged position wherein said pin is separated from said jaw portion, and a latch element to latch said coupling shaft in said disengaged position, said calculator including a multiplication key, normally ineffective control means operable by said result key to move said latch element into ineffective position, and means operated by said multiplication key for making said control means effective whereby operation of said result key following operation of said multiplication key will release said coupling shaft from its disengaged position, an abutment pin in the calculator, said member being biased to engage said abutment pin and thereby holding the said pin therein in alignment with said jaw portion of said slide bar, said member having an inclined surface thereon, a control pin engageable with said inclined surface for urging said coupling shaft from disengaged position toward engaged position, a cam on the main shaft of the calculator to reciprocate said control pin during a calculating cycle, and a spring between said cam and said control pin which will cause the control pin to shift the coupling shaft when the latter is unlatched and which will compress when the coupling shaft is latched.

11. In a printing ten digit key calculator of the four function type having a laterally moveable pin carriage, a laterally moveable register carriage, storage unit means, longitudinally reciprocable rack means operable to transmit values set in said pin carriage by said digit keys to said register and said storage unit means, and first preselecting means for preselecting a decimal point position prior to a calculating operation; means for producing a digit value of 5, said register carriage having a plurality of input wheels, input means for inserting said digit value into a selected one of said input wheels, coupling means operable to couple said digit producing means to said input means, said calculator having function keys including a multiplication key and a result key, second preselecting means for adjusting said input means into operative alignment with a selected one of said input wheels pertaining to that column of figures which is immediately to the right of the lowest decimal place to be printed, means operable during a calculating operation not involving decimals for making said coupling means ineffective to prevent operation of said input means, means for making said coupling means effective to actuate said input means during a calculation involving a decimal point, said first and second preselecting means comprising adjacent manually adjustable slides, said input means comprising a laterally shiftable shaft, and linkage connecting said shaft with the slide of said second preselecting means for lateral adjustment of said shaft in conformity with the shifted position of said second preselecting means, a plurality of printing wheels, and means operable for preventing said wheels from printing when said wheels are disposed rightwardly of a predetermined digit following the preselected decimal point.

12. A calculating machine according to claim 11 in which the said rack means pertaining to the lowermost places of the calculating machine each comprises a main rack portion free of teeth within the range of the said register, and an auxiliary rack having teeth within the range of said register, cut-outs at the rearward lower ends of both of said racks, means engaging said cut-outs to couple said racks together in their basic position, and means for causing said last mentioned means to disengage said auxiliary rack for a clearing operation.

13. A calculating machine according to claim 12 in which an arresting lever is provided behind each of said main racks and the pertaining auxiliary rack, cooperating elements of abutment means on said arresting lever and said calculator normally holding said arresting lever in ineffective position, and means operable upon movement of said racks during a calculating operation for causing said arresting lever to engage said main rack while leaving said auxiliary rack free to move.

14. A calculating machine according to claim 13 in which said printing wheels are carried by swingable printing hammers, the hammers of the lowermost places of the calculator being provided with extensions and arresting grooves, arresting rods carried by said arresting lever, said rods having ears thereon, and means for disposing said ears in said grooves for preventing said printing hammers from operating during a printing cycle.

15. A calculating machine according to claim 14 which includes a shaft carrying said arresting lever, other levers connected with said shaft, a coupling rod connected with said other levers and means for adjusting said rod in said other levers to effect engagement thereof with preselected ones of said arresting levers.

16. A calculating machine according to claim 15 in which a pin is provided connected to said rod, a slotted plate into which said pin extends, and means for reciprocating said plate to adjust said rod relative to said arresting levers.

17. A calculating machine according to claim 11 in which the slide pertaining to said second preselecting means is provided with teeth, a pin engaging said teeth so as to be moved thereby during said actuation of said second preselecting means, teeth on the slide pertaining to said first preselecting means, said pin also engaging said last mentioned teeth and means operated by a function key of said calculator to lock said pin in engagement with the teeth of both of said slides.

18. A calculating machine according to claim 11 in which a slotted plate is connected to the slide pertaining to said second preselecting means, said plate being pivotal on said slide, said plate having an arcuate slot therein toward the back, a straight slot extending forwardly from the top of said arcuate slot, a stationary pin extending into said slots, an extension on the forward end of said plate, a pin on the slide pertaining to said first preselecting means engageable with said extension, and slot and shoulder means in said plate extending from the forward end of said straight slot whereby the relative positioning of said slides is under the control of said plate.

19. A calculating machine according to claim 18 in which said pins and plate provide for different displacements of said slides relative to each other for different positions of said first preselecting means.

20. A calculating machine according to claim 19 in which said calculating machine comprises printing wheels and printing hammers supporting the wheels, means for selectively making the printing hammers pertaining to the lowermost decimal places ineffective, a plate having a cam slot therein for adjusting said last mentioned means, said last mentioned plate being adapted for abutting said slotted plate, and means operable during the machine cycle, and comprising a tiltable lever for moving said plate having the cam slot therein into abutting engagement with said slotted plate for determination of the number of printing hammers to be held in ineffective position.

References Cited

UNITED STATES PATENTS

| | | | |
|---|---|---|---|
| 2,328,611 | 9/1943 | Bryce et al. | 235—61.6 |
| 3,076,597 | 2/1963 | Gelling | 235—61 |
| 3,080,111 | 3/1963 | Gelling | 235—60.15 |
| 3,081,938 | 3/1963 | Walther et al. | 235—60.15 |
| 3,107,607 | 10/1963 | Chall et al. | 101—93 |
| 3,194,495 | 7/1965 | Gang | 235—60.15 |

STEPHEN J. TOMSKY, *Primary Examiner.*

U.S. Cl. X.R.

235—60, 61